United States Patent
Chornenky et al.

(10) Patent No.: US 6,185,294 B1
(45) Date of Patent: *Feb. 6, 2001

(54) METHOD AND APPARATUS FOR INSTALLING TELEPHONE INTERCOM-VOICE MESSAGING APPARATUS AT DOORBELL FOR DWELLING

(76) Inventors: O. Joseph Chornenky, 6538 N. First Pl., Phoenix, AZ (US) 85012; Michael G. Maxson, 5402 W. Electra La., Glendale, AZ (US) 85310; John C. Stuart, 8011 N. 15th Ave., Phoenix, AZ (US) 85021

( * ) Notice: Under 35 U.S.C. 154(b), the term of this patent shall be extended for 0 days.

This patent is subject to a terminal disclaimer.

(21) Appl. No.: 09/018,325
(22) Filed: Feb. 3, 1998

Related U.S. Application Data (63) Continuation-in-part of application No. 08/811,498, filed on Mar. 5, 1997, now Pat. No. 5,905,787, which is a continuation-in-part of application No. 08/742,498, filed on Nov. 1, 1996, now Pat. No. 5,784,446.

(51) Int. Cl.[7] .............................. G04M 1/60; G04M 1/64
(52) U.S. Cl. .......................... 379/350; 379/169; 379/413
(58) Field of Search ........................ 379/102.01, 102.02, 379/102.03, 167, 169, 172, 176, 376, 413, 447, 446, 168, 170, 171, 102.4; 348/155, 156

(56) References Cited

U.S. PATENT DOCUMENTS

| | | | |
|---|---|---|---|
| 4,764,953 * | 8/1988 | Chern et al. | 379/355 |
| 5,363,434 * | 11/1994 | Farinelli et al. | 379/170 |
| 5,428,388 * | 6/1995 | Von Bauer et al. | 348/155 |
| 5,612,994 * | 3/1997 | Chen | 379/167 |

* cited by examiner

*Primary Examiner*—David R. Hudspeth
*Assistant Examiner*—Abul K. Azad
(74) *Attorney, Agent, or Firm*—Tod R. Nissle, P.C (57) ABSTRACT

A doorbell response system in used in a dwelling including a telephone line and a telephone. The doorbell response system includes a doorbell, doorbell button, speaker, microphone, dialer to initiate the dialing of a telephone number, connection between the microphone and speaker, a system for eliminating the dial tone in the telephone line for a selected period of time so a person can communicate over the microphone and speaker, a system for dialing a number when the dialer is activated, a battery for the doorbell and doorbell button and telephone, and a trickle charge from the telephone line to the battery.

2 Claims, 3 Drawing Sheets

METHOD AND APPARATUS FOR INSTALLING TELEPHONE INTERCOM-VOICE MESSAGING APPARATUS AT DOORBELL FOR DWELLING

CROSS-REFERENCE TO RELATED APPLICATIONS

This application is a continuation-in-part of application Ser. No. 08/811,498, filed Mar. 5, 1997, now U.S. Pat. No. 5,905,787, which is a continuation-in-part of application Ser. No. 08/742,498, filed Nov. 1, 1996, now U.S. Pat. No. 5,784,446.

STATEMENT REGARDING FEDERALLY SPONSORED RESEARCH OR DEVELOPMENT

Not Applicable.

REFERENCE TO "MICROFICHE APPENDIX" (SEE 37 CFR 1.96)

Not Applicable.

BACKGROUND OF THE INVENTION

1. Field of the Invention

This invention relates to doorbells.

More particularly, the invention pertains to a doorbell response system which can be retrofit in an existing doorbell system without requiring the incorporation of new wiring in the existing doorbell system.

In a further respect, the invention pertains to a doorbell—telephone intercom system which can be utilized in conjunction with an existing doorbell and telephone(s) in a residence.

2. Description of the Related Art Including Information Disclosed Under 37 CFR 1.97 and 1.98.

The use of an intercom system in a residence is well known in the art, with intercoms often being provided at the front door of the residence so that the inhabitants of the residence can converse with a visitor standing outside at the front door. The intercom includes a microphone for receiving verbal communications from the visitor standing at the front door, and includes a speaker for audibly relaying to the visitor comments made by the inhabitants of the residence.

In one such prior art system, the speaker and microphone are wired to a digital signal processor. The digital processor is spliced into the wiring leading from the doorbell button to the doorbell of the residence. The digital processor is also connected to a Public Switched Telephone Network (PSTN) just as if the digital processor were an ordinary telephone. When the doorbell button is actuated by a visitor standing at a door of the residence, the digital processor waits a predetermined length of time for a telephone in the residence to go off hook. If the residence phone is taken off hook by an inhabitant of the residence, then the phone is, without utilizing the PSTN, connected to the intercom to permit the inhabitant to speak to the visitor. If the residence phone does not go off hook, then the digital processor autodials a number over the PSTN to a remote telephone located outside the residence. See, for example, U.S. Pat. No. 4,764,953 to Chern et al. The use of a local or remote telephone to communicate with an intercom at the door of a residence is well known in the art. Although intercom—telephone systems are widely utilized in the art, such systems often have long standing disadvantages. First, the circuitry and/or components associated with such intercom—telephone systems is often complicated and requires the use of specialized telephony or other components. Second, prior art systems typically require the cutting or splicing of existing wiring and circuitry, making the retrofitting of such systems impractical. Once a residence has been constructed and the telephone and doorbell lines installed, most homeowners are not inclined to attempt to incorporate new wiring or system components in a wall. Third, while autodialing is a known feature of doorbell—intercom systems, such systems do not give a visitor the flexibility of selecting to leave a message or to communicate with the inhabitants of a residence. Fourth, prior art systems do not enable a visitor the ability to communicate over the PSTN with an inhabitant of the residence on every phone in the residence.

Accordingly, it would be highly desirable to provide an improved doorbell—intercom system which could be quickly installed without requiring the splicing or alteration of the existing wiring in a residence, which would be simple in manufacture, which would permit a visitor to call a remote telephone site, and which would permit a visitor to leave a message for the inhabitants of the residence.

Therefore, it is a principal object of the invention to provide an improved doorbell system.

A further object of the invention is to provide an improved method and apparatus for installing a doorbell—intercom system.

Another object of the invention is to provide an improved doorbell—intercom system which gives a visitor the ability to select whether to converse with an inhabitant of the residence, to leave a message, or to call a remote telephone.

BRIEF DESCRIPTION OF THE SEVERAL VIEWS OF THE DRAWING(S)

These and other, further and more specific objects and advantages of the invention will be apparent to those skilled in the art from the following detailed description thereof, taken in conjunction with the drawings, in which.

BRIEF SUMMARY OF THE INVENTION

Briefly, in accordance with the invention, we provide an improved method for installing a doorbell response system in a dwelling. The dwelling includes telephone lines; a telephone jack connected to the telephone lines; and, a telephone connected to the telephone lines and having an assigned telephone number utilized to call the telephone. The improved method includes the steps of providing a first auxiliary unit including an auxiliary doorbell button, a speaker, a microphone, a dialing system activated by a user for initiating the dialing of a telephone number, and a first transmitter for transmitting and receiving signals; of providing a second auxiliary unit including a system for connecting the second unit to receive electrical power, a system for connecting the second unit to the telephone outlet to enable a person to communicate via the microphone and speaker with another person speaking over said telephone lines, a system for eliminating for a selected period of time after the auxiliary door button is depressed the dial tone in the telephone lines so that a person may utilize the microphone and speaker to converse over the telephone lines with another person using the telephone in the dwelling, a system for dialing a number when the dialing system is activated by a user to initiate the dialing of the assigned telephone number, and a second transmitter for sending and receiving signals to and from the first transmitter; a system mounted in at least one of the first auxiliary unit and the second auxiliary unit to eliminate for a selected period of time after the auxiliary door button is depressed the dial tone in the telephone lines so that a person may utilize the microphone and speaker to converse over the telephone lines with another person using the telephone in the dwelling, and to dial a number when the dialing system is activated by a user to initiate the dialing of the assigned telephone number; connecting power to the first auxiliary unit and connecting the second auxiliary unit to the telephone jack such that depressing the auxiliary doorbell button actuates the doorbell and eliminates the dial tone when a person in the dwelling uses the telephone to speak via the second transmitter and said first transmitter over the microphone and to hear voice communication directed into the speaker by a user, and such that the dialing system can be activated by a user to initiate via the first transmitter and the second transmitter the dialing of the assigned telephone number.

In another embodiment of the invention, we provide an improved doorbell response system in combination with a dwelling. The dwelling includes a telephone line, and a telephone connected to the telephone line and having an assigned telephone number utilized to call the telephone. The improved doorbell response system includes a first auxiliary unit including an auxiliary doorbell button; a speaker; a microphone; a dialing system activated by a user for initiating the dialing of a telephone number; and, a first transmitter for transmitting and receiving signals. The doorbell response system also includes a second auxiliary unit including a system for connecting the second unit to electrical power; a connector for connecting the second unit to the telephone line to enable a person to communicate via the microphone and speaker with another person speaking over the telephone line; a system for eliminate for a selected period of time after the auxiliary door button is depressed the dial tone in the telephone lines so that a person may utilize said microphone and speaker to converse over the telephone line with another person using the telephone in the dwelling; a system for dialing a number when the dialing system is activated by a user to initiate the dialing of the assigned telephone number; and, a second transmitter for sending and receiving signals to and from the first transmitter. The doorbell response system also includes a system mounted in at least one of the first auxiliary unit and the second auxiliary unit to eliminate for a selected period of time after the auxiliary door button is depressed the dial tone in the telephone line so that a person may utilize the microphone and speaker to converse over the telephone line with another person using the telephone in the dwelling; and, to dial a number when the dialing system is activated by a user to initiate the dialing of the assigned telephone number.

In a further embodiment of the invention, we provide an improved doorbell response system in a dwelling. The dwelling includes at least one telephone line; and, a telephone connected to the telephone line and having an assigned telephone number utilized to call the telephone. The improved doorbell response system includes a doorbell button; a speaker; a microphone; a dialing system activated by a user for initiating the dialing of a telephone number; a connector for connecting the speaker and microphone to the telephone line to enable a person to communicate via the microphone and speaker with another person to communicate via the microphone and speaker with another person speaking over the telephone line; a system for eliminating for a selected period of time after the doorbell button is depressed the dial tone in the telephone line so that a person amy utilize the microphone and speaker to converse over the telephone line with another person using the telephone in the dwelling; and, a system for dialing a number when the dialing system is activated by a user to initiate the dialing of a selected telephone number.

In still another embodiment of the invention, we provide an improved doorbell response system for a dwelling. The dwelling includes at least one telephone line carrying a selected current of less than about two amps, and a telephone connected to the telephone line and having an assigned telephone number utilized to call the telephone. The improved doorbell response system includes an auxiliary unit including an auxiliary doorbell button; a speaker; a microphone; a dialing system activated by a user for initiating the dialing of a telephone number; a connector means for connecting the auxiliary unit to the telephone line to enable a person to communicate via the microphone and speaker with another person speaking over the telephone line; a system for eliminating for a selected period of time after the auxiliary door button is depressed the dial tone in the telephone line so that a person may utilize the microphone and speaker to converse over the telephone line with another person using the telephone in the dwelling; and, a system for dialing a number when the dialing system is activated by a user to initiate the dialing of a selected telephone number. The improved doorbell response system also includes a batter for providing power to at least one of the auxiliary unit and the telephone; and, a system for connecting said telephone line to the battery such that the telephone line provides a trickle charge for the battery.

In still a further embodiment of the invention, we provide an improved doorbell response system for a dwelling. The dwelling includes at least one telephone line carrying a selected current of less than about two amps, and a telephone connected to the telephone line and having an assigned telephone number utilized to call the telephone. The improved doorbell response system includes a doorbell; a doorbell button which is depressed to activate the doorbell; a speaker; a microphone; a dialing system activated by a user for initiating the dialing of a telephone number; a system for connecting the speaker and microphone to the telephone line to enable a person to communicate via the microphone and speaker with another person speaking over the telephone line; a system for eliminating for a selected period of time after the door button is depressed the dial tone in the telephone line so that a person may utilize said microphone and speaker to converse over the telephone line with another person may utilize said microphone and speaker to converse over the telephone line with another person using the telephone in the dwelling; a system for dialing a number when the dialing system is activated by a user to initiate the dialing of a selected telephone number; a battery for providing power to at least one of the doorbell button, the doorbell, and the telephone; and, a system for connecting the telephone line to the batter such that the telephone line provides a trickle charge for the battery.

In yet another embodiment of the invention, we provide an improved doorbell response system for a dwelling. The dwelling includes a POTS telephone line, and a telephone connected to the telephone line and having an assigned telephone number utilized to call the telephone. The improved doorbell response system includes a doorbell; a doorbell button which is depressed to activate said doorbell; a system for generating a video signal, a modulation system connected to the telephone line to receive the video signal and to receive an audio signal from the telephone for modulation and simultaneous transmission of the video signal and audio signal over the telephone line.

In yet a further embodiment of the invention, we provide an improved visitor response system for a dwelling. The dwelling includes a POTS telephone line carrying a selected current of less than about two amps, and a telephone connected to the telephone line and having an assigned telephone number utilized to call the telephone. The improved visitor response systems includes a response unit including at least one of the group consisting of a doorbell, a video camera, a motion detector, alarm means, and a system for communicating with the telephone from the exterior of the dwelling; a battery for providing power for the response unit; and, a system for connecting the telephone line to the battery such that the telephone line provides a trickle charge for the battery.

In a further embodiment of the invention, we provide a visitor response system for a dwelling. The dwelling includes a telephone line; a telephone connected to the telephone line and having an assigned telephone number utilized to call the telephone; and, a pair of wires for a doorbell, the wires carrying a selected current of less than about two amps and providing a voltage in the range of about eight to twenty-four volts. The visitor response system includes a response system including at least one of the group consisting of a doorbell, a video camera, a motion detector, alarm means, and a system for communicating with said telephone from the exterior of said dwelling; a battery for providing power for the response means; and, a system for connecting the wires to the battery such that the wires provide a trickle charge for the battery.

DETAILED DESCRIPTION OF THE INVENTION

Figure 1:
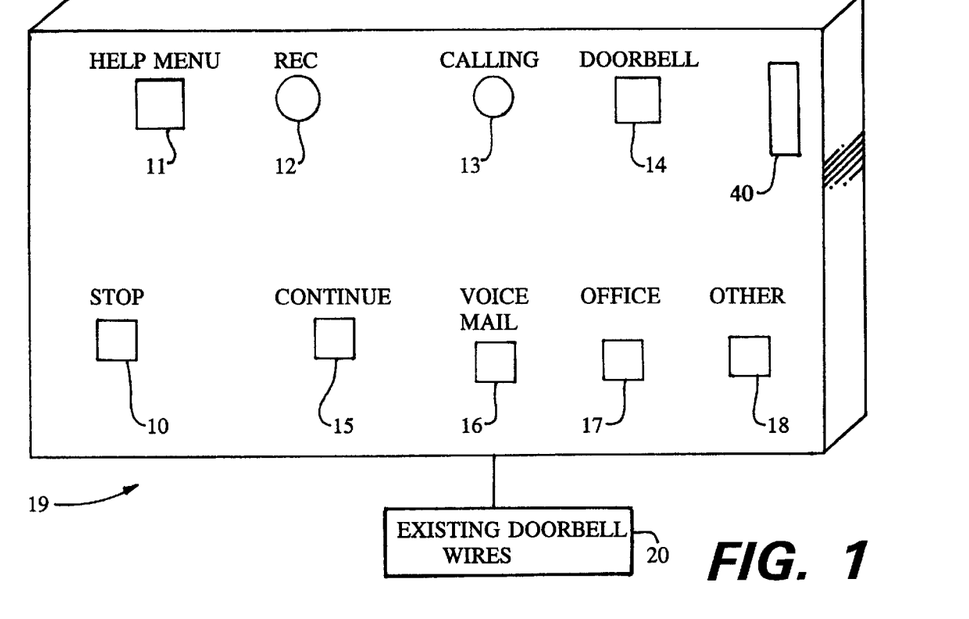
FIG. 1 is a perspective view illustrating a control unit mounted in the entryway of a residence and constructed in accordance with the principles of the invention.

Turning now to the drawings, which depict the presently preferred embodiments of the invention for the purpose of illustrating the practice thereof and not by way of limitation of the scope of the invention, and in which like reference characters refer to corresponding elements throughout the several views, FIG. 1 illustrates the door unit of the doorbell response system of the invention. The response system of the invention is preferably utilized in a residence. Residences included homes, business building structures, and other structures inhabited or occupied at least periodically by human beings. As will be explained, the door unit of FIG. 1 (and FIG. 2) interacts with the telephone interface unit illustrated in FIGS. 3 and 4.

The door unit 19 of FIG. 1 includes a rectangular housing. Mounted in housing 19 are buttons or touch pads 10, 11, 15, 16, 17, and 18. If desired, unit 19 can be adapted to receive voice commands or to utilize other communication systems besides buttons 10, 11, 15 to 18. LED's 12 and 13 are also mounted in housing 19, along with speaker 28, microphone 27, and transmitter-receiver 40. Unit 19 is mounted outside the door to a residence by removing the existing doorbell button and attaching unit 19 to the existing pair of wires which powered the removed existing doorbell button. This pair of wires subsequently provides the electrical power to operate unit 19. The pair of wires leading to a conventional doorbell button ordinarily carry about 0.6 to 0.7 amps of current and provide a voltage in the range of about eight to twenty-four volts.

When depressed or touched, button 11 activates a voice menu which causes audio signals to be produced by speaker 28. These audio signals consist of a person's voice explaining how the buttons on unit 19 are operated. If desired, these audio signals can be automatically activated and produced when a visitor depresses doorbell button 14. Controller 24 (FIG. 2) senses when buttons 10, 11, 14 to 18 are depressed and, as will be described, generates appropriate responses and commands.

When depressed or touched, button 14 functions to close the circuit comprised in part of the existing doorbell wires so that the existing doorbell in the residence is actuated and rings. When depressed or touched, button 10 discontinues the connection between unit 19 and a telephone in the residence and also discontinues the dial tone block which occurs as a result of a visitor depressing button 14.

When depressed or touched, button 15 continues or re-initiates the dial tone block which permits the inhabitant of the residence to utilize a telephone in the residence to converse with a visitor over microphone 27 and speaker 28. After a visitor initially depresses button 14, the continue button ordinarily can only be depressed several times because if no call is dialed after about a minute, the telephone company switching station automatically initiates a busy signal, initiates a taped voice request that the caller dial a telephone number, or takes some other action automatically. If desired, button 15 can be eliminated and unit 19 can be constructed such that the controller in unit 19 automatically performs the function of button 15 and continues the dial tone block for as long as possible or necessary.

When depressed or touched, button 16 causes the number of the residence to be dialed so that, if the number is not answered, a message can be left on the voice mail of the residence telephone.

If desired, an answering machine is provided in unit 19, in a telephone in the residence, or at another location in the residence. If such an answering machine is provided, unit 19 is constructed and programmed such that depressing button 16 connects unit 19 to the answering machine and activates the answering machine so the visitor can recite a message over microphone 27 and have the message recorded on the answering machine. The utilization of such a "local" answering machine moots having to rely on the voice mail system of the local telephone company. When the answering machine is in a telephone in the residence, depressing button 16 generates a signal(s) which is transmitted via radio frequency, hard wire, satellite, microwave, POTS telephone line, or another communication line or channel to a processor in the telephone. The processor receives the signal(s) and transmits the signal(s) to the answering machine to operate the answering machine and permit a voice message embodied in the signal(s) to be recorded on the answering machine.

When depressed or touched, button 17 causes a number to be dialed which places a call to a telephone which is remote from the residence.

When depressed or touched, button 18 causes a number to be dialed which places a call to a telephone at a desired location at or remote from the residence.

Figure 2:
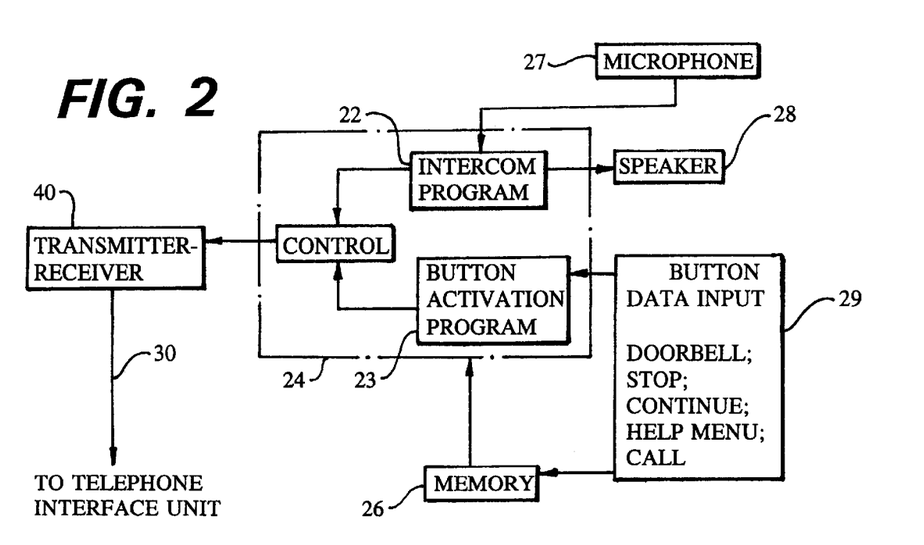
FIG. 2 is a block diagram illustrating the mode of operation of the control unit of FIG. 2.

The block diagram of FIG. 2 further illustrates unit 19 as including a computer or microprocessor including a controller 24 and a memory 26. Button data input 29 (signals from doorbell button 14, stop button 10, continue button 15, help menu button 11, a call button 16 to 18, from the telephone interface unit via transmitter-receiver 37, or, if desired, other or comparable data signals from a keyboard, punched card reader, paper tape reader, optical scanner, etc.), microphone 27, speaker 28, and transmitter-receiver 40 are also provided. A CRT or other data output means or display operatively associated with controller 24 can also, if desired, be provided and display information on a CRT screen.

The controller 24 can be a digital computer, analog computer, hybrid computer, or other programmable apparatus. In practice, the very large majority of computers comprise digital computers.

The memory 26 can be any suitable prior art memory unit such as are commonly used in digital or other computers. For example, electromagnetic memories such as magnetic, optical, solid state, etc. or mechanical memories such as paper tape.

Data can be input into memory 26 prior to the operation of the door unit of FIG. 2. Such data can be utilized by the button activation program 23 to interpret a signal received from transmitter-receiver 37 or from button data input 29 and to determine the proper commands to be issued by controller 24 in response to the signal. Similarly, data from memory 26 can be utilized by the intercom program to interpret a signal received from microphone 27, speaker 28, or transmitter-receiver 40 (from transmitter-receive 37) and to determine the proper commands to be issued by controller 24 in response to the signal. Various apparatus and procedures for transmitting and receiving audio signals from a microphone or telephone to a speaker via a telephone line and/or transmitter-receiver 40 is well known in the art and will not be detailed herein.

Figure 3:
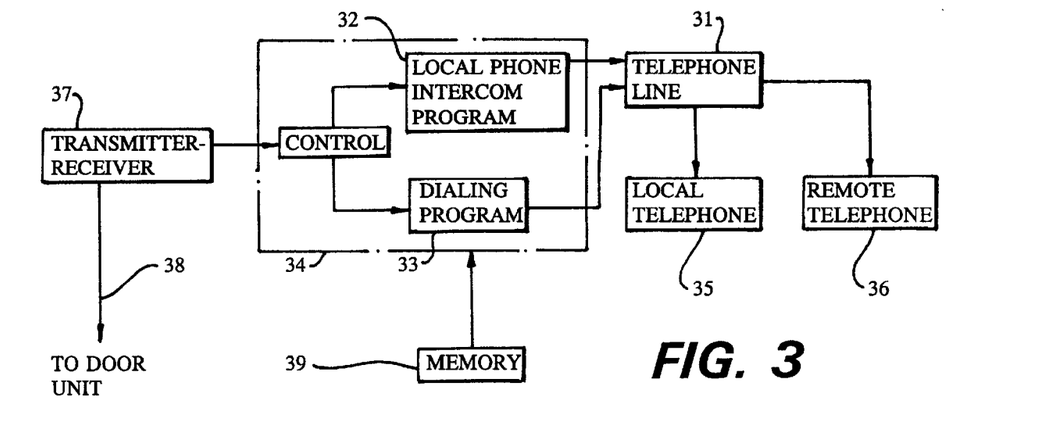
FIG. 3 is a block diagram illustrating a remote telephone interface unit utilized in accordance with the invention.

Data can be input into memory 39 prior to the operation of the telephone interface unit of FIG. 3. Such data can be utilized by the local phone intercom program 32 to interpret a signal received from transmitter-receiver 40 or from telephone line 31 and to determine the proper commands to be issued by controller 24 in response to the signal. Similarly, data from memory 39 can be utilized by the dialing program 33 to interpret a signal received from transmitter-receiver 40 and to determine the proper commands to be issued by controller 34 in response to the signal. Various apparatus and procedures for transmitting and receiving signals from a telephone line is well known in the art and will not be detailed herein.

The block diagram of FIG. 3 illustrates the remote telephone interface unit 50 (FIG. 4) as including a computer or microprocessor including a controller 34 and a memory 39. A transmitter-receiver 37 and interface with telephone line 31 are included. The telephone line interface typically comprises the cable 42 and clip 43 shown in FIG. 4. Clip 43 is removably clipped into a telephone wall jack in conventional fashion. Telephone line 31 is connected to a local telephone 35 in the residence at which the doorbell response system of the invention is installed, and is also connected to a telephone 36 which is remote from the residence at which the doorbell response system of the invention is installed. The transmitter-receiver sends signals to and receives signals from transmitter-receiver 40.

Figure 4:
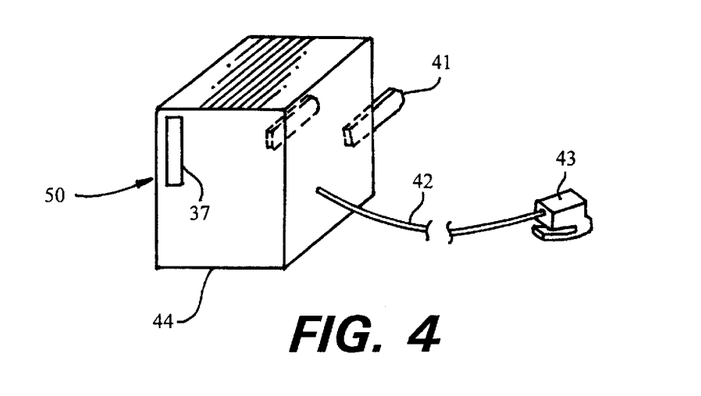
FIG. 4 is a perspective view further illustrating the remote telephone interface unit of FIG. 3.

In FIG. 4, the telephone interface unit 50 includes housing 44, transmitter-receiver 37, a pair of prongs 41 for insertion in a conventional 110 volt AC wall outlet, cable 42 and clip 43.

In use, the doorbell button is removed from the existing doorbell at an entrance to a residence. The pair of wires which were connected to the existing doorbell button are connected to door unit 19 to provide the power for unit 19. The prongs 41 of telephone interface unit 50 are inserted in a 110 volt AC wall outlet and clip 43 is inserted in a telephone wall jack to connect unit 50 to the telephone line in the residence where units 19 and 50 are installed.

When a visitor presses button 11, button data input 29 transmits a signal to controller 24 which interprets the signal as being generated as the result of the visitor depressing button 11. Controller 22 commands the intercom program 22 send signals to speaker 28 such that the speaker 28 broadcasts sounds which produce a spoken verbal description of how unit 19 is operated by the visitor.

When a visitor presses button 14, button data input 29 transmits a signal to controller 24 which interprets the signal as being generated as the result of the visitor depressing button 14. Controller 22 commands the button activation program to close the circuit which includes the existing doorbell wires for a selected period of time so that the existing doorbell in the residence rings (or, pressing button 14 can physically close the circuit and cause the existing doorbell in the residence to ring). Controller 24 also directs transmitter-receiver 40 to send 30 a signal to transmitter-receiver 37 advising that button 14 has been depressed. Transmitter-receiver 37 transmits this information to controller 34 which utilizes the local phone intercom program 32 to produce a signal which is equivalent to dialing a "1" so that the dial tone on the local telephone is disabled and the inhabitant of the residence can pick up the local telephone(s) 35 and converse with the visitor via transmitter-receiver 37, transmitter-receiver 40, speaker 28, and microphone 27. If the inhabitant of the residence picks up the telephone(s) 35 at this point, has a conversation with the visitor, and hangs up, then the visitor can hit the stop button 10 to hang up the door unit, or, a timer in the door unit will automatically hang up the door unit after a pre-selected period of time has passed. When the door unit hangs up (after button 10 is pushed or when the timer in the door units hangs up the door unit), program 32 eliminates the dial tone disable so an incoming telephone call can be made to local telephone 35. If after ten to fifteen seconds, the inhabitant of the residence does not pick up the receiver of telephone(s) 35 and the visitor wishes to continue the dial tone disable, the visitor depresses the continue button 15. When the visitor presses button 15, button data input 29 transmits a signal to controller 24 which interprets the signal as being generated as the result of the visitor depressing button 15. Controller 22 directs transmitter-receiver 40 to send 30 a signal to transmitter-receiver 37 advising that button 15 has been depressed. Transmitter-receiver 37 transmits this information to controller 34 which utilizes the local phone intercom program 32 to produce a signal which is equivalent to dialing a "1" so that the dial tone disable on the local telephone is continued so that the inhabitant of the residence can pick up the local telephone(s) 35 and converse with the visitor via transmitter-receiver 37, transmitter-receiver 40, speaker 28, and microphone 27. Button 15 can presently be depressed only six times before telephone company switching equipment will interrupt and begin either requesting that a telephone number be dialed, or that a number has been misdialed. When the telephone switching equipment interrupts, the visitor can continue the conversation by depressing the stop button 10, ringing the doorbell 14 again, and by waiting for the inhabitant of the residence to again pick up and begin to converse with the visitor over the local telephone(s) 35. If a DTMF decoder is included in unit 19, then the inhabitant of the residence can press the number one button on his phone to continue the dial tone disable on the local telephone(s).

When a visitor presses button 16, button data input 29 transmits a signal to controller 24 which interprets the signal as being generated as the result of the visitor depressing button 16. Controller 22 directs transmitter-receiver 40 to send 30 a signal to transmitter-receiver 37 advising that button 16 has been depressed. Transmitter-receiver 37 transmits this information to controller 34 which utilizes the dialing program 33 and memory 39 to dial a pre-programmed number which calls telephone 35 such that telephone 35 in conventional fashion dials the phone number of the line it is on to access voice mail so the visitor can leave a message in voice mail. The visitor can, via speaker 28, hear the call being made and can leave a message in voice mail by speaking into microphone 27 which transmits the message into voice mail via program 22, transmitter-receiver 40, transmitter-receiver 37, dialing program 33, and telephone line 31. The use of voice mail to leave a message while dialing the phone number of the line you are on is well known and the apparatus for accomplishing such will not be outlined in detail here. Voice mail messages are readily retrieved by the inhabitant of a residence using his local telephone 35 to dial a seven digit number and then press selected number keys on telephone 35 to access the message, which is played back to the inhabitant over the speaker in the receiver of telephone 35.

When a visitor presses button 17, button data input 29 transmits a signal to controller 24 which interprets the signal as being generated as the result of the visitor depressing button 17. Controller 22 directs transmitter-receiver 40 to send 30 a signal to transmitter-receiver 37 advising that button 17 has been depressed. Transmitter-receiver 37 transmits this information to controller 34 which utilizes the dialing program 33 and memory 39 to dial a pre-programmed number which calls telephone 36 and which, in the event telephone 36 is not answered and voice mail is available for telephone 36, waits for voice mail to be accessed so the visitor can leave a message in voice mail. The visitor can, via speaker 28, hear the call being made and can leave a message in voice mail by speaking into microphone 27 which transmits the message into voice mail via program 22, transmitter-receiver 40, transmitter-receiver 37, dialing program 33, and telephone line 31. In the event an individual answers the call made to telephone 36, the visitor can also converse with that individual over microphone 27 and speaker 28 via program 22, transmitter-receiver 40, transmitter-receiver 37, etc.

When a visitor presses button 18, button data input 29 transmits a signal to controller 24 which interprets the signal as being generated as the result of the visitor depressing button 18. Controller 22 directs transmitter-receiver 40 to send 30 a signal to transmitter-receiver 37 advising that button 18 has been depressed. Transmitter-receiver 37 transmits this information to controller 34 which utilizes the dialing program 33 and memory 39 to dial a pre-selected number which calls a selected telephone other than telephone 35 or telephone 36.

The doorbell response system described herein is believed to be advantageous because it can be installed without cutting existing wire, breaking into existing walls, integrating new wiring or system components into a building structure, or redesigning existing telephone systems. Installation is unusually simple because it only requires that unit 50 be plugged into an outlet and telephone jack and that unit 19 take the place of the existing doorbell button. The doorbell response system of the invention also permits a visitor to select whether he wishes to speak with an inhabitant of a residence or simply wishes to leave a message. Finally, the system of the invention is provided with a help menu which describes to a visitor how the door unit is utilized.

In an alternate embodiment of the invention, a transmitter-receiver 40 is not utilized to send signals to transmitter-receiver 37. Instead transmitter-receivers 37 and 40 are eliminated and a wire interconnects door unit 19 and unit 50. Signals are transmitted from unit 19 over the wire to unit 50 and vice-versa.

In yet a further embodiment of the invention, transmitter-receivers 37 and 40 are eliminated, unit 50 (or the components comprising unit 50) is incorporated in door unit 19, and a wire interconnects unit 50 with telephone line 31. Unit 50 can be "hard wired" to telephone line 31, or, a cable 42 and clip 43 can be utilized to connect unit 50 to a wall mounted or other telephone jack.

Unit 50 can be powered by conventional 110 volt AC or by direct current supplied either by a battery or by an AC or a DC converter or step down transformer plugged into or connected to a 110 volt AC wall outlet. The battery can be trickle charged using the doorbell wires, POTS lines, or another source of electricity.

Although not necessary, it is presently preferred that an incoming telephone call which causes a telephone in the dwelling to ring can not be accessed by a person standing at the front door of the dwelling and utilizing unit 19. The incoming call does not ring over speaker 28. If a person standing at the door is able to hear the ringer on a telephone in the dwelling, he still cannot utilize unit 19 to access the incoming call. As would be appreciated by those of skill in the art, a switch or other means can readily be incorporated in unit 19 to prevent access to an incoming call (i.e., a call from a telephone outside of and remote from the dwelling) to a telephone in the dwelling.

Figure 5:
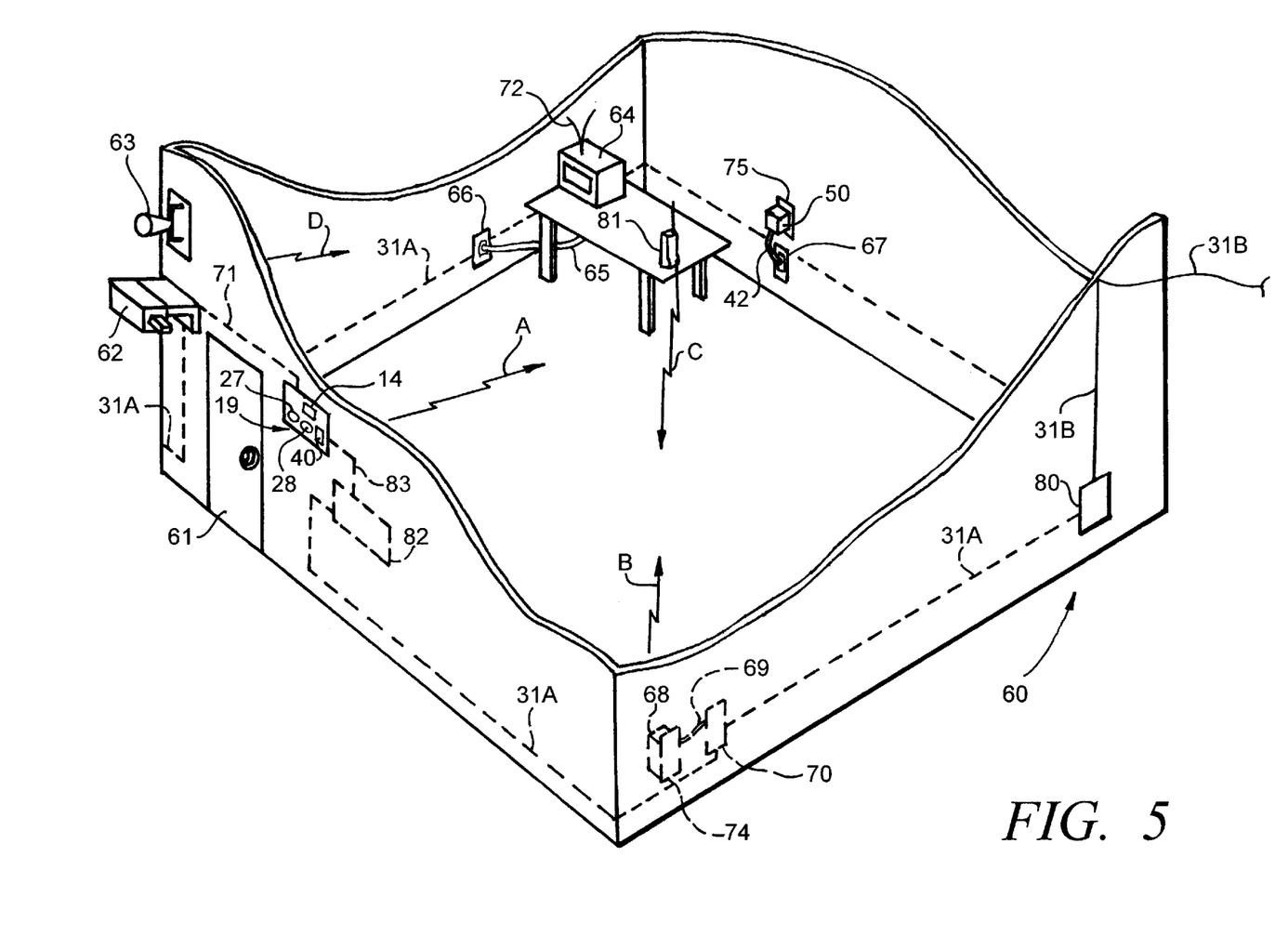
FIG. 5 is a perspective view illustrating a dwelling constructed in accordance with the invention.

The dwelling 60 in FIG. 5 includes front door 61, video camera 62 for viewing visitors standing outside dwelling 60 near door 61, alarm 63, door unit 29, interior POTS (Plain Old Telephone System) telephone line 31A, line 71 extending from camera 62 to unit 19 to transmit video signals to unit 19, telephone jacks 66–67 and 69 connected to line 31A, and, 120 VAC wall outlets 74 and 75 (the conventional wiring supplying electrical power to outlets 74 and 75 is omitted for the sake of clarity). Telephone signals are transmitted to and from dwelling 60 over exterior telephone line 31B. Exterior telephone line 31B is connected to line 31A at junction box 80. As earlier described, unit 19 includes microphone 27, speaker 28, doorbell button 14, and transmitter—receiver 40. Unit 19 also includes other buttons or components which although not visible in FIG. 5 are depicted in FIG. 1.

A telephone interface unit 50 is plugged into electrical wall outlet 75. The clip 43 of cable 42 of unit 50 is plugged into telephone wall jack 67 to interconnect cable 42 and unit 50 with telephone line 31A. Unit 50 communicates with unit 19 in the manner earlier described herein. For example, transmitter—receiver 40 sends wireless signals to unit 50 in the manner indicated by arrow A.

Telephone interface unit 68 is plugged into electrical wall outlet 74 and includes a cable 69 which is plugged into telephone wall jack 70 in the same manner that cable 42 is plugged into telephone wall jack 67. Unit 68 transmits telephone call signals to cordless telephone 81 in the manner indicated by arrows B. Telephone 81 transmits a telephone call signal to unit 68 in the manner indicated by arrows C.

Consequently, as is well known, a caller in dwelling 60 initiates a call by holding telephone 81, by pressing a button telephone 81 to obtain a dial tone, and by depressing buttons (typically seven buttons for a local call, more for a long distance call) representing the telephone number of person or establishment being called. When the person being called (hereafter "the recipient" of the call) picks up his telephone, the caller in dwelling 60 converses with the recipient via telephone 81, unit 68, and telephone line 31A and 31B.

Television or computer monitor 64 can receive signals from camera 62 by wireless signal indicated by arrow D (from transmitter on camera 62) or via telephone line 31A. When telephone line 31A is utilized to transmit simultaneously a video signal from camera 62 and an audio signal from telephone 81 or from unit 19, modulators will ordinarily be utilized. A modularos in camera 62 (or unit 19) transmits a modulated signal over line 31A to television 64. A modulator in television 64 receives the signal and puts it in a form which can be utilized by the television to produce an image on the television screen. Similarly, an incoming telephone call is received by a modulator at junction 80, is processed by the modulator, and is sent over line 31A to unit 68. Unit 68 includes a modulator which processes the modulated signal from line 31A and put it in a form processable by telephone 81. Finally, an audio or video signal received by unit 19 is received by a modulator in unit 19, is process by the modulator and is transmitted over line 31A to junction 80. At junction 80, the modulated signal from unit 19 typically is received by a modulator positioned at junction 80, and is processed for transmission over line 31B. An audio signal from unit 19 can be transmitted A to a modulator in unit 50; from the modulator in unit 50 through line 31B to a modulator at junction 80: and, from a modulator at junction 80 through telephone line 31B.

If a telephone call comes in over line 31B while camera 62 is sending a video signal over line 31A, a modulator at junction 80 ordinarily receives the call and transmits it over line 31A at the same time the video signal is being transmitted over line 31A. While it is possible that camera 62 can produce an analog signal, the camera 62 likely to be utilized is one which produces a digital signal.

The modulators utilized in the invention preferably can accept and transmit over line 31A audio signals, video signals, and computer produced digital signals.

Line 31A is connected to battery 82 to provide a trickle charge for battery 82. The current output of line 31A normally is less than about two amps, typically less than one amp. The battery 82 preferably includes a limiter circuit which halts the charging of battery 82 by line 31A when the limiter circuit detects AC voltage when an incoming call from line 31B causes telephone 81 to ring. Once telephone 81 stops ringing (i.e., the incoming caller hangs up or the person holding telephone 81 and receiving the call takes telephone 81 off hook), the limiter circuit permits the charging of battery 82 to continue. The limiter circuit can also be designed to permit the charging of battery 82 (and flow of current from line 31A to battery 82) only when telephone is not being used to make or receive a call. Accordingly, one primary purpose of the limiter circuit is to permit current from line 31A to be used to charge battery 82 without altering the current draw by the battery to increase by too much. If the battery causes the current draw in line 31A to increase too much, lines 31B and 31A are automatically shut down by telephone company equipment. Electrical energy from battery 82 travels through line 83 to unit 19 to power unit 19. Battery 82 or another battery or batteries can be utilized to power camera 62, alarm 63, a motion sensor, a telephone, or any other piece of equipment in or near dwelling 60. When battery 82 is utilized to provide the power for unit 19 unit 19 may not need to be connected to the wires which provided power for an original doorbell button (which original button was replaced by unit 19), and, unit 19 also may not need otherwise to be wired to another source of electrical power. Battery 82 can be charged by electricity generated by a solar-powered panel, generated by a windmill, provided by the doorbell wires as a trickle charge, or by any other means. A battery 82 can be separate from unit 19 in the manner illustrated in FIG. 5, or can be incorporated into unit 19 (or camera 62, alarm 63, etc.).

When unit 19 is connected to a conventional 120 VAC line in dwelling 60, a transformer can be utilized to reduce the voltage to 16 volts AC or to another desired level. Many door bells only require about 16 volts AC. Such transformers can, if appropriate, also be utilized in conjunction with camera 262, alarm 63, or with any with any other equipment in dwelling 60.

Controller 24 can receive at any designated time—typically when a visitor depresses button 14 to activate a doorbell in dwelling 60—a video signal from camera 62 and prepare and transmit via transmitter 40 an RF signal to antenna 72 on television 64. Alternately, unit 19 can transmit a video signal from camera 62 over telephone line 31A via jack 66 and line 65 to television 64. As earlier mentioned, a video signal can, without being transmitted to unit 19, be transmitted directly from camera 62 to television or CRT 64 either via line 31A or another hard wired line or by a wireless signal indicated by arrows D. Also as earlier discussed, modulators are preferably utilized when a video or other signal is transmitted over telephone line 31A to television 64, or, when a video or other signal is transmitted over telephone line 31A to junction 80 for transmission over line 31B to another dwelling or another desired remote location. Television or CRT 64 can be separate as illustrated in FIG. 5, or can be incorporated in telephone 81 or another piece of equipment.

Controller 24 can be programmed to send a video signal from camera 62 to television 64, to a video recorder like a VCR, or over lines 31A and 31B to an office or other location remote from dwelling 60.

In one embodiment of the invention a DTMF decoder is included in unit 19 or in dwelling 60. The DTMF decoder receives the sounds produced when the number keys on a telephone are depressed to activated. The decoder is preferably connected to a unit which electrically controls and can open and close the strike plate of a door 61. The strike plate is in the door jamb. If, for example, a visitor is standing outside dwelling 60 in front of locked door 61 and requires access, the visitor can push button 17 and cause unit 19 to make a telephone call to an individual at a remote office. The individual picks up the call and converses with the visitor. If the individual wishes, he or she can, while on the telephone line, press four (or any desired selected number) of the touch tone keys on his phone (for example, the keys for numbers "2", "5", "6", and "9") to produce the code which causes the lock on door 61 to open. The four tones or "code" produced by pushing the four keys are received by the DTMF decoder which interprets the tones to produce a numerical code that authorizes the opening of door 61. The DTMF decoder then activates the unit which controls the handle of door 61, causing the unit to move the strike plate so the visitor can open door 61 and enter dwelling 60. A touch tone key pad similar to that found on a telephone can be incorporated in unit 19 so that a visitor can, by depressing the appropriate ones of the touch tone keys, also produce for a DTMF decoder the code necessary to activate the unit which laterally displaces the strike pate to permit a visitor to open door 61.

Instead of utilizing a DTMF decoder, controller 24 can be programmed such that when a sensor (not shown) connected to controller 24 transmits the appropriate data to controller 24, controller 24 sends the signals necessary to open door 61. The sensor connected to controller 24 can be constructed to read a magnetic strip on a card, read information stored in a magnetic strip on a ring worn by a visitor, or to read data from any other data source carried on or by the visitor.

Having described my invention and the presently preferred embodiments thereof in a manner understandable to those of skill in the art, we claim:

1. In combination with a dwelling, said dwelling including
    at least one telephone line carrying a selected current of less than about two amps, and
    a telephone connected to the telephone line and having an assigned telephone number utilized to call the telephone,
    a doorbell response system including
    (a) an auxiliary unit including
        (i) an auxiliary doorbell button,
        (ii) a speaker,
        (iii) a microphone,
        (iv) dialing means activated by a user for initiating the dialing of a telephone number,
        (v) connector means for connecting said auxiliary unit to the telephone line to enable a person to communicate via said microphone and said speaker with another person speaking over the telephone line,
        (vi) means for eliminating for a selected period of time after the auxiliary door button is depressed the dial tone in the telephone line so that a person may utilize said microphone and speaker to converse over the telephone line with another person using the telephone in the dwelling, and
        (vii) means for dialing a number when said dialing means is activated by a user to initiate the dialing of a selected telephone number;
    (b) a battery for providing power to at least one of said auxiliary unit and the telephone; and,
    (c) means for connecting the telephone line to said battery such that the telephone line provides a trickle charge for said battery.

2. In combination with a dwelling, said dwelling including
    at least one telephone line carrying a selected current of less than about two amps, and
    a telephone connected to the telephone line and having an assigned telephone number utilized to call the telephone,
    a doorbell response system including
    (a) a doorbell;
    (b) a doorbell button which is depressed to activate said doorbell;
    (c) a speaker;
    (d) a microphone
    (e) dialing means activated by a user for initiating the dialing of a telephone number;
    (f) means for connecting said speaker and microphone to the telephone line to enable a person to communicate via said microphone and speaker with another person speaking over the telephone line;
    (g) means for eliminating for a selected period of time after the doorbell button is depressed the dial tone in the telephone line so that a person may utilize said microphone and speaker to converse over the telephone line with another person using the telephone in the dwelling;
    (h) means for dialing a number when said dialing means is activated by a user to initiate the dialing of a selected telephone number;
    (i) a battery for providing power to at least one of said doorbell button, said doorbell, and the telephone; and,
    (j) means for connecting the telephone line to said battery such that the telephone line provides a trickle charge for said battery.

* * * * *